(12) United States Patent
Yamamoto

(10) Patent No.: US 8,831,803 B2
(45) Date of Patent: Sep. 9, 2014

(54) HYBRID VEHICLE, METHOD OF NOTIFICATION FOR HYBRID VEHICLE, AND COMPUTER-READABLE STORAGE MEDIUM HAVING PROGRAM STORED THEREON FOR CAUSING COMPUTER TO EXECUTE METHOD OF NOTIFICATION FOR HYBRID VEHICLE

(75) Inventor: Shigeo Yamamoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 383 days.

(21) Appl. No.: 12/673,111

(22) PCT Filed: Aug. 13, 2008

(86) PCT No.: PCT/JP2008/064771
§ 371 (c)(1),
(2), (4) Date: Feb. 11, 2010

(87) PCT Pub. No.: WO2009/028357
PCT Pub. Date: Mar. 5, 2009

(65) Prior Publication Data
US 2011/0010030 A1 Jan. 13, 2011

(30) Foreign Application Priority Data
Aug. 24, 2007 (JP) .................. 2007-218159

(51) Int. Cl.
| | | |
|---|---|---|
| *B60K 6/00* | (2006.01) | |
| *B60K 6/365* | (2007.10) | |
| *B60W 10/08* | (2006.01) | |
| *B60L 3/12* | (2006.01) | |
| *B60W 10/26* | (2006.01) | |
| *B60L 15/20* | (2006.01) | |
| *B60K 6/445* | (2007.10) | |
| *B60K 1/02* | (2006.01) | |
| *B60W 20/00* | (2006.01) | |

(52) U.S. Cl.
CPC ............ *B60K 6/445* (2013.01); *B60W 2540/10* (2013.01); *B60K 1/02* (2013.01); *Y02T 10/6269* (2013.01); *Y02T 10/56* (2013.01); *B60K 6/365* (2013.01); *B60W 10/08* (2013.01); *B60W 2510/244* (2013.01); *B60W 2520/10* (2013.01); *B60L 2240/423* (2013.01); *Y02T 10/7283* (2013.01); *B60L 3/12* (2013.01); *B60W 10/26* (2013.01); *B60W 2510/081* (2013.01); *B60L 15/2045* (2013.01); *B60W 20/00* (2013.01); *B60L 2240/421* (2013.01); *Y02T 10/642* (2013.01); *B60Y 2200/90* (2013.01); *B60W 2510/083* (2013.01); *Y02T 10/6239* (2013.01)
USPC .............. 701/22; 701/36; 701/101; 701/103; 701/109; 701/123; 180/65.1; 180/65.25; 180/165; 180/243; 320/104; 320/149; 320/155

(58) Field of Classification Search
USPC ..................... 701/22, 123, 36, 101, 103, 109; 180/65.1, 65.21, 65.285, 243, 284; 320/119, 122, 128, 130, 136, 152, 158
See application file for complete search history.

(56) References Cited

U.S. PATENT DOCUMENTS

| | | | |
|---|---|---|---|
| 5,670,830 A | 9/1997 | Koga et al. | |
| 5,802,174 A | 9/1998 | Sako et al. | |
| 6,201,312 B1 | 3/2001 | Shioiri et al. | |
| 6,335,610 B1* | 1/2002 | Winstead | 320/132 |
| 6,701,064 B1 | 3/2004 | De Haan et al. | |
| 6,923,279 B2* | 8/2005 | Shimane et al. | 180/65.1 |
| 6,925,369 B2* | 8/2005 | Obayashi et al. | 701/36 |
| 7,565,942 B2 | 7/2009 | Shibata et al. | |
| 7,892,328 B2* | 2/2011 | Nakao et al. | 96/132 |
| 8,616,323 B1* | 12/2013 | Gurin | 180/305 |
| 2002/0062183 A1* | 5/2002 | Yamaguchi et al. | 701/22 |
| 2003/0144779 A1 | 7/2003 | Obayashi et al. | |
| 2004/0128975 A1* | 7/2004 | Viteri | 60/39.55 |
| 2007/0176762 A1 | 8/2007 | Aoyagi et al. | |
| 2008/0042821 A1 | 2/2008 | Kaya | |
| 2009/0096285 A1* | 4/2009 | Acena et al. | 307/10.1 |
| 2010/0175370 A1* | 7/2010 | Bunge | 60/277 |
| 2010/0241339 A1* | 9/2010 | Proietty et al. | 701/109 |
| 2012/0226424 A1* | 9/2012 | Adams | 701/93 |

FOREIGN PATENT DOCUMENTS

| | | |
|---|---|---|
| CN | 1426061 A | 6/2003 |
| EP | 1 199 205 A2 | 4/2002 |
| JP | Y2-63-1211 | 1/1988 |
| JP | A-11-220803 | 8/1999 |
| JP | A-11-220807 | 8/1999 |
| JP | A-11-229916 | 8/1999 |
| JP | A-11-351942 | 12/1999 |
| JP | A-2002-118905 | 4/2002 |
| JP | A-2002-274219 | 9/2002 |
| JP | A-2003-220907 | 8/2003 |
| JP | A-2006-220482 | 8/2006 |
| JP | A-2007-185083 | 7/2007 |
| JP | A-2007-209063 | 8/2007 |
| JP | A-2007-239511 | 9/2007 |
| JP | A-2008-197076 | 8/2008 |
| JP | A-2009-35049 | 2/2009 |
| RU | 2233011 C2 | 7/2004 |
| WO | WO 2006/124130 A1 | 11/2006 |
| WO | WO 2007/066198 A2 | 6/2007 |
| WO | WO 2007066198 A2 * | 6/2007 ................ H02J 7/04 |

OTHER PUBLICATIONS

Jan. 19, 2010 Office Action issued in Japanese Patent Application 2007-218159 (with translation).

Supplementary European Search Report dated Oct. 20, 2010 in corresponding European Patent Application No. 08 792 551.7.

Chinese Office Action dated Dec. 8, 2011 in Chinese Patent Application No. 200880104113.9 (with translation).

International Search Report mailed on Nov. 25, 2008 in corresponding International Application No. PCT/JP2008/064771 (with translation).

Decision on Grant issued in Russian Patent Application No. 2010111109 dated Jun. 3, 2011 (with translation).

* cited by examiner

*Primary Examiner* — John R Olszewski
*Assistant Examiner* — Truc M Do
(74) *Attorney, Agent, or Firm* — Oliff PLC

(57) ABSTRACT

A hybrid vehicle is configured to be capable of traveling with fuel and electric power serving as energy sources. A charger receives electric power from an external power supply connected to a charging port to charge a power storage device. An ECU calculates a distance traveled per unit amount of electric power supplied from the external power supply by the charger and a distance traveled per unit amount of fuel consumed by an engine. A notification unit notifies a user of each distance traveled, as calculated by the ECU.

34 Claims, 9 Drawing Sheets

HYBRID VEHICLE, METHOD OF NOTIFICATION FOR HYBRID VEHICLE, AND COMPUTER-READABLE STORAGE MEDIUM HAVING PROGRAM STORED THEREON FOR CAUSING COMPUTER TO EXECUTE METHOD OF NOTIFICATION FOR HYBRID VEHICLE

TECHNICAL FIELD

The present invention relates to vehicles externally supplied with a plurality of types of energy.

BACKGROUND ART

Japanese Patent Laying-Open No. 11-220807 discloses a mileage indicator for a hybrid vehicle. The mileage indicator calculates a reference fuel economy depending on the vehicle's traveling state, and the mileage indicator indicates a measured fuel economy in comparison with the reference fuel economy.

In recent years a hybrid vehicle allowing its mounted power storage device to be charged from a power supply external thereto is gaining attention. This externally chargeable hybrid vehicle can be externally supplied with two types of energy, i.e., fuel and electric power.

When this type of hybrid vehicle is supplied with energy, whether it should be supplied with both or one of fuel and electric power can be determined by the user of the vehicle, as desired. However, the information available to the user in supplying energy is limited to a unit price of fuel and a unit price of electric power or the like.

DISCLOSURE OF THE INVENTION

The present invention contemplates providing a user of a vehicle receiving a plurality of types of energy to travel with more beneficial information than conventional.

The present invention provides a hybrid vehicle traveling with fuel and electric power serving as energy sources, including: a charging device configured to be capable of charging a power storage device from a power supply external to the vehicle, the power storage device storing the electric power; a calculation unit for calculating a first physical quantity involved in consuming first electric power supplied from outside the vehicle by the charging device and a second physical quantity involved in consuming the fuel; and a notification unit for notifying a user of information based on the first and second physical quantities calculated by the calculation unit.

Preferably, the power storage device stores second electric power of electrical energy converted from energy attributed to the fuel, and the calculation unit calculates the second physical quantity using the second electric power.

Preferably, the first physical quantity is a value having a correlation with a ratio of an amount of electric power supplied from the power supply external to the vehicle and a distance traveled on the amount of electric power, and the second physical quantity is a value having a correlation with a ratio of an amount of the fuel and a distance traveled on the amount of the fuel.

Preferably, the information based on the first and second physical quantities is a value having a correlation with a ratio of a sum of a physical quantity corresponding to an amount of electric power supplied from the power supply external to the vehicle and a physical quantity corresponding to an amount of the fuel and a sum of a distance traveled on the amount of electric power and a distance traveled on the fuel.

Preferably, the first physical quantity is a first distance traveled (L1) indicating a distance traveled per unit amount of electric power supplied from the power supply external to the vehicle, and the second physical quantity is a second distance traveled (L2) indicating a distance traveled per unit amount of the fuel.

More preferably, the hybrid vehicle further includes: an internal combustion engine supplied with the fuel; an electric motor supplied with the electric power for causing the vehicle to travel; and a traveling mode control unit for controlling switching between traveling modes including a first mode (an EV mode) causing the vehicle to travel with the internal combustion engine stopped and a second mode (an HV mode) including a mode causing the vehicle to travel with the internal combustion engine operated. The calculation unit in the first mode calculates the first distance traveled and in the second mode calculates the second distance traveled.

More preferably, the calculation unit calculates the first distance traveled, such that regenerated electric power recovered in the first mode by the electric motor is assumed as electric power supplied from the power supply external to the vehicle, recovered, and the calculation unit calculates the second distance traveled, such that regenerated electric power recovered in the second mode is assumed as an amount of fuel equivalent to the regenerated electric power converted in terms of fuel, recovered.

Preferably, the first physical quantity is a first cost (a traveling cost C1) indicating a cost, per unit distance traveled, of electric power supplied from the power supply external to the vehicle, and the second physical quantity is a second cost (a traveling cost C2) indicating a cost of the fuel per unit distance traveled.

More preferably, the hybrid vehicle further includes: an internal combustion engine supplied with the fuel; an electric motor supplied with the electric power for causing the vehicle to travel; and a traveling mode control unit for controlling switching between traveling modes including a first mode (an EV mode) causing the vehicle to travel with the internal combustion engine stopped and a second mode (an HV mode) including a mode causing the vehicle to travel with the internal combustion engine operated. The calculation unit in the first mode calculates the first cost and in the second mode calculates the second cost.

More preferably, the calculation unit calculates the first cost such that regenerated electric power recovered in the first mode by the electric motor is assumed as electric power supplied from the power supply external to the vehicle, recovered, and the calculation unit calculates the second cost such that regenerated electric power recovered in the second mode is assumed as an amount of fuel equivalent to the regenerated electric power converted in terms of fuel, recovered.

Preferably, the notification unit further notifies the user of a sum of the first and second costs.

Preferably, the first physical quantity is a value having a correlation with an amount of carbon dioxide emitted corresponding to electric power supplied from the power supply external to the vehicle, and the second physical quantity is a value having a correlation with an amount of carbon dioxide emitted corresponding to the fuel consumed.

Preferably, the first physical quantity is a first amount of carbon dioxide emitted (EM1) indicating an amount of carbon dioxide emitted, per unit distance traveled, attributed to electric power supplied from the power supply external to the vehicle, and the second physical quantity is a second amount of carbon dioxide emitted (EM2) indicating an amount of carbon dioxide emitted per unit distance traveled on the fuel.

More preferably, the hybrid vehicle further includes: an internal combustion engine supplied with the fuel; an electric motor supplied with the electric power for causing the vehicle to travel; and a traveling mode control unit for controlling switching between traveling modes including a first mode (an EV mode) causing the vehicle to travel with the internal combustion engine stopped and a second mode (an HV mode) including a traveling mode causing the vehicle to travel with the internal combustion engine operated. The calculation unit in the first mode calculates the first amount of carbon dioxide emitted and in the second mode calculates the second amount of carbon dioxide emitted.

More preferably, the calculation unit calculates the first amount of carbon dioxide emitted, such that regenerated electric power recovered in the first mode by the electric motor is assumed as electric power supplied from the power supply external to the vehicle, recovered, and the calculation unit calculates the second amount of carbon dioxide emitted, such that regenerated electric power recovered in the second mode is assumed as an amount of fuel equivalent to the regenerated electric power converted in terms of fuel, recovered.

Preferably, the notification unit further notifies the user of a sum of the first and second amounts of carbon dioxide emitted.

The present invention further provides a method of notification for a hybrid vehicle traveling with fuel and electric power serving as energy sources. The hybrid vehicle includes a charging device configured to be capable of charging a power storage device from a power supply external to the vehicle, the power storage device storing the electric power. The method includes the steps of: calculating a first physical quantity involved in consuming first electric power supplied from outside the vehicle by the charging device; calculating a second physical quantity involved in consuming the fuel; and notifying a user of information based on the first and second physical quantities calculated.

Preferably, the power storage device stores second electric power of electrical energy converted from energy attributed to the fuel, and the second physical quantity is calculated using the second electric power.

Preferably, the first physical quantity is a value having a correlation with a ratio of an amount of electric power supplied from the power supply external to the vehicle and a distance traveled on the amount of electric power, and the second physical quantity is a value having a correlation with a ratio of an amount of the fuel and a distance traveled on the amount of the fuel.

Preferably, the information based on the first and second physical quantities is a value having a correlation with a ratio of a sum of a physical quantity corresponding to an amount of electric power supplied from the power supply external to the vehicle and a physical quantity corresponding to an amount of the fuel and a sum of a distance traveled on the amount of electric power and a distance traveled on the fuel.

Preferably, the first physical quantity is a first distance traveled (L1) indicating a distance traveled per unit amount of electric power supplied from the power supply external to the vehicle, and the second physical quantity is a second distance traveled (L2) indicating a distance traveled per unit amount of the fuel.

More preferably, the hybrid vehicle has mounted therein an internal combustion engine supplied with the fuel and an electric motor supplied with the electric power for causing the vehicle to travel and is capable of traveling in one of a first mode (an EV mode) causing the vehicle to travel with the internal combustion engine stopped and a second mode (an HV mode) including a mode causing the vehicle to travel with the internal combustion engine operated, and in the first mode the first distance traveled is calculated in the step of calculating the first distance traveled and in the second mode the second distance traveled is calculated in the step of calculating the second distance traveled.

More preferably, the step of calculating the first distance traveled includes calculating the first distance traveled, such that regenerated electric power recovered in the first mode by the electric motor is assumed as electric power supplied from the power supply external to the vehicle, recovered, and the step of calculating the second distance traveled includes calculating the second distance traveled, such that regenerated electric power recovered in the second mode is assumed as an amount of fuel equivalent to the regenerated electric power converted in terms of fuel, recovered.

Preferably, the first physical quantity is a first cost (a traveling cost C1) indicating a cost, per unit distance traveled, of electric power supplied from the power supply external to the vehicle, and the second physical quantity is a second cost (a traveling cost C2) indicating a cost of the fuel per unit distance traveled.

More preferably, the hybrid vehicle has mounted therein an internal combustion engine supplied with the fuel and an electric motor supplied with the electric power for causing the vehicle to travel and is capable of traveling in one of a first mode (an EV mode) causing the vehicle to travel with the internal combustion engine stopped and a second mode (an HV mode) including a mode causing the vehicle to travel with the internal combustion engine operated, and in the first mode the first cost is calculated in the step of calculating the first cost and in the second mode the second cost is calculated in the step of calculating the second cost.

More preferably, the step of calculating the first cost includes calculating the first cost such that regenerated electric power recovered in the first mode by the electric motor is assumed as electric power supplied from the power supply external to the vehicle, recovered, and the step of calculating the second cost includes calculating the second cost such that regenerated electric power recovered in the second mode is assumed as an amount of fuel equivalent to the regenerated electric power converted in terms of fuel, recovered.

Preferably, the method of notification for a hybrid vehicle further includes the step of notifying the user of a sum of the first and second costs.

Preferably, the first physical quantity is a value having a correlation with an amount of carbon dioxide emitted corresponding to electric power supplied from the power supply external to the vehicle, and the second physical quantity is a value having a correlation with an amount of carbon dioxide emitted corresponding to the fuel consumed.

Preferably, the first physical quantity is a first amount of carbon dioxide emitted (EM1) indicating an amount of carbon dioxide emitted, per unit distance traveled, attributed to electric power supplied from the power supply external to the vehicle, and the second physical quantity is a second amount of carbon dioxide emitted (EM2) indicating an amount of carbon dioxide emitted per unit distance traveled on the fuel.

Preferably, the hybrid vehicle has mounted therein an internal combustion engine supplied with the fuel and an electric motor supplied with the electric power for causing the vehicle to travel and is capable of traveling in one of a first mode (an EV mode) causing the vehicle to travel with the internal combustion engine stopped and a second mode (an HV mode) including a mode causing the vehicle to travel with the internal combustion engine operated, and in the first mode the first amount of carbon dioxide emitted is calculated in the step of calculating the first amount of carbon dioxide emitted and in the second mode the second amount of carbon dioxide emitted is calculated in the step of calculating the second amount of carbon dioxide emitted.

More preferably, the step of calculating the first amount of carbon dioxide emitted includes calculating the first amount of carbon dioxide emitted, such that regenerated electric power recovered in the first mode by the electric motor is assumed as electric power supplied from the power supply external to the vehicle, recovered, and the step of calculating the second amount of carbon dioxide emitted includes calculating the second amount of carbon dioxide emitted, such that regenerated electric power recovered in the second mode is assumed as an amount of fuel equivalent to the regenerated electric power converted in terms of fuel, recovered.

Preferably, the method of notification for a hybrid vehicle further includes the step of notifying the user of a sum of the first and second amounts of carbon dioxide emitted.

Furthermore, the present invention provides a storage medium that is a computer-readable storage medium having a program stored thereon for causing a computer to execute the method of notification for a hybrid vehicle, as described above.

The present invention allows a vehicle to have a power storage device charged from an external source by a charging device, and according to the present invention, a first physical quantity involved in consuming electric power charged and a second physical quantity involved in consuming fuel can be calculated and information based on the first and second physical quantities can be indicated to a user. The user can thus be notified of a physical quantity involved in consuming each type of energy (fuel and electric power) supplied from outside the vehicle.

Furthermore, according to the present invention, a first distance traveled indicating a distance traveled per unit amount of electric power charged and a second distance traveled indicating a distance traveled per unit amount of fuel can be calculated and indicated to a user. The user can thus be notified of a distance traveled per unit amount of each type of energy (fuel and electric power) supplied from outside the vehicle.

Furthermore, according to the present invention, a first cost indicating a cost, per unit distance traveled, of electric power supplied from a power supply external to the vehicle and a second cost indicating a cost of fuel per unit distance traveled can be calculated and indicated to a user. The user can thus be notified of a traveling cost for each type of energy (fuel and electric power) supplied from outside the vehicle.

Furthermore, according to the present invention, a first amount of carbon dioxide emitted indicating an amount of carbon dioxide emitted, per unit distance traveled, attributed to electric power supplied from a power supply external to the vehicle and a second amount of carbon dioxide emitted indicating an amount of carbon dioxide emitted per unit distance traveled on fuel can be calculated and indicated to a user. The user can thus be notified of an amount of carbon dioxide emitted for each type of energy (fuel and electric power) supplied from outside the vehicle.

BEST MODE FOR CARRYING OUT THE INVENTION

Hereinafter reference will be made to the drawings to describe the present invention in embodiments. In the figures, identical or corresponding components are identically denoted and will not be described repeatedly in detail.

First Embodiment

Figure 1:
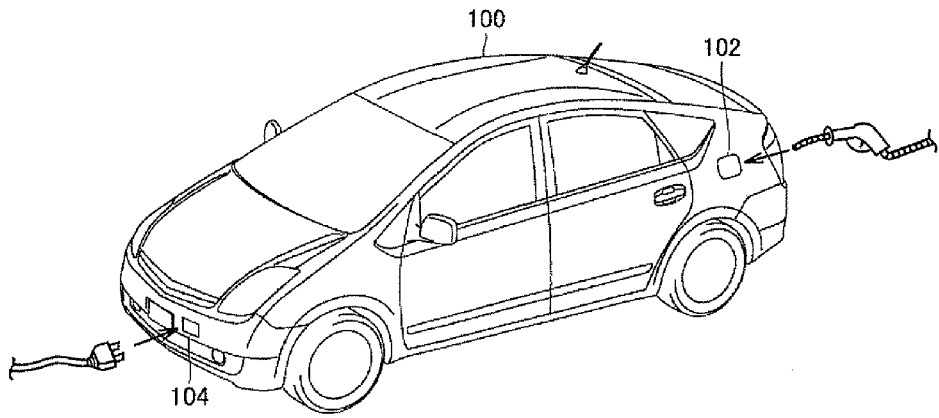
FIG. 1 shows an external appearance of a hybrid vehicle in an embodiment of the present invention.

FIG. 1 shows an external appearance of a hybrid vehicle in an embodiment of the present invention. With reference to FIG. 1, a hybrid vehicle 100 includes a fuel supplying port 102 and a charging port 104. Hybrid vehicle 100 can employ an engine and a motor generator to travel, as will be described later, and is also configured such that a power storage device supplying the motor generator with electric power is chargeable from a power supply external to the vehicle.

Fuel supplying port 102 is a port for supplying fuel to a fuel tank reserving fuel used by the engine. Charging port 104 is an external charging interface for supplying electric power to a power storage device from a power supply external to the vehicle (hereinafter also referred to as an "external power supply").

In other words, hybrid vehicle 100 can externally be supplied with two types of energy, i.e., fuel and electric power, and users of such vehicles may be concerned with energy economy and cost for each type of energy (i.e., fuel and electric power) externally supplied. Accordingly in hybrid vehicle 100 the user is notified of energy economy or the like information for each type of energy (fuel and electric power) externally supplied, as will be described hereinafter.

Figure 2:
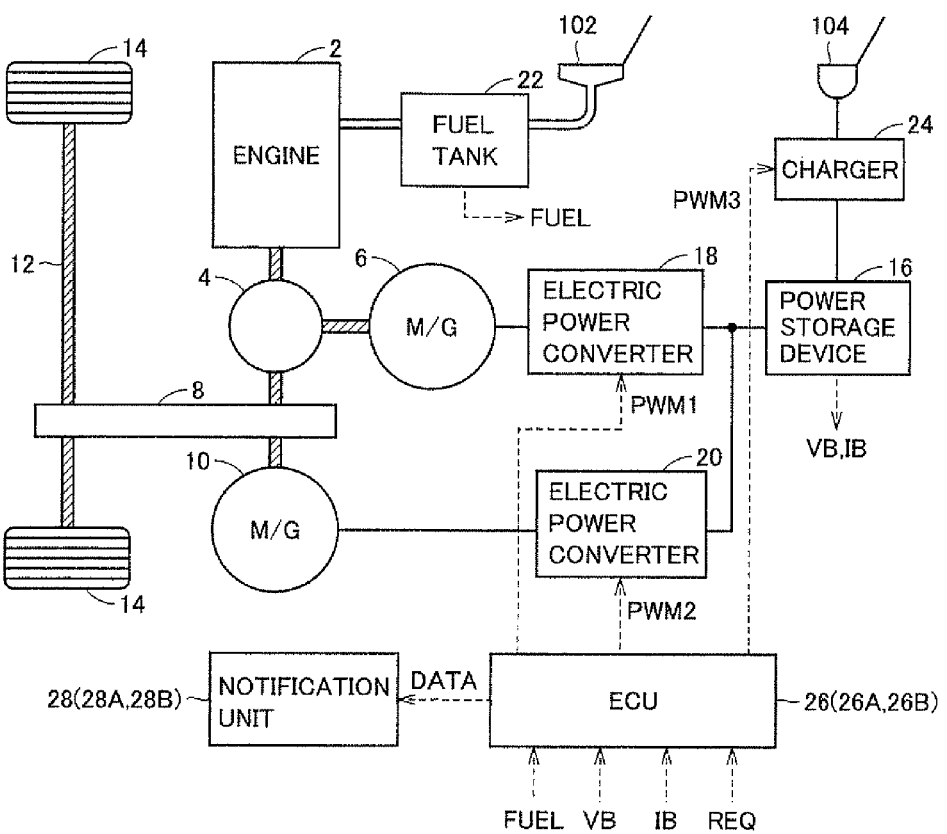
FIG. 2 is a functional block diagram of a hybrid vehicle of a first embodiment.

FIG. 2 is a functional block diagram of the hybrid vehicle in the first embodiment. With reference to FIG. 2, hybrid vehicle 100 includes an engine 2, a power split device 4, motor generators 6, 10, a transmission gear 8, a drive shaft 12, and a vehicular wheel 14. Hybrid vehicle 100 further includes a power storage device 16, electric power converters 18, 20, a fuel tank 22, fuel supplying port 102, a charger 24, charging port 104, an electronic control unit (ECU) 26, and a notification unit 28.

Power split device 4 is coupled to engine 2, motor generator 6 and transmission gear 8 to distribute power therebetween. For example, a planetary gear having three shafts of rotation of a sun gear, a planetary carrier and a ring gear can be used as power split device 4, and these three shafts of rotation are connected to those of rotation of engine 2, motor generator 6 and transmission gear 8, respectively. Furthermore, motor generator 10 has its shaft of rotation coupled to that of rotation of transmission gear 8. In other words, motor generator 10 and transmission gear 8 have the same shaft of rotation, and that shaft of rotation is connected to the ring gear of power split device 4.

Engine 2 generates kinetic energy which is in turn distributed by power split device 4 to motor generator 6 and transmission gear 8. In other words, engine 2 is incorporated in hybrid vehicle 100 as a power source that drives transmission gear 8 transmitting power to drive shaft 12 and also drives motor generator 6. Motor generator 6 is incorporated in hybrid vehicle 100 as a component operating as an electric power generator driven by engine 2 and as an electric motor that can start engine 2. Motor generator 10 is incorporated in hybrid vehicle 100 as a power source that drives transmission gear 8 transmitting power to drive shaft 12.

Power storage device 16 is a chargeable and dischargeable direct current power supply, and is for example a nickel metal hydride, lithium ion, or similar secondary battery. Power storage device 16 supplies electric power converters 18, 20 with electric power. Furthermore, when motor generator 6 and/or motor generator 10 generate(s) electric power, power storage device 16 receives electric power from electric power converter 18 and/or electric power converter 20 and is thus charged therewith. Furthermore, when power storage device 16 is charged from an external power supply (not shown) connected to charging port 104, power storage device 16 receives electric power from charger 24 and is thus charged therewith. Note that power storage device 16 may be a capacitor of large capacity, and may be any electric power buffer that can temporarily store electric power generated by motor generators 6, 10 and electric power received from an external power supply and supply the stored electric power to motor generators 6, 10. Note that power storage device 16 has a voltage VB and receives/outputs a current TB, which are sensed by sensors (not shown) and their sensed values are output to ECU 26.

Electric power converter 18 operates in response to a signal PWM1 received from ECU 26 to convert electric power that is generated by motor generator 6 to direct current electric power and output the direct current electric power to power storage device 16. Electric power converter 20 operates in response to a signal PWM2 received from ECU 26 to convert direct current electric power that is received from power storage device 16 to alternate current electric power and output the alternate current electric power to motor generator 10. Note that when engine 2 starts, electric power converter 18 operates in response to signal PWM1 to convert direct current electric power that is received from power storage device 16 to alternate current electric power and output the alternate current electric power to motor generator 6. Furthermore, when the vehicle is braked or travels downhill and its acceleration is reduced or the like, electric power converter 20 operates in response to signal PWM2 to convert electric power that is generated by motor generator 10 to direct current electric power and output the direct current electric power to power storage device 16.

Motor generator 6, 10 is an alternate current electric motor, and is for example a 3-phase alternate current synchronous electric motor having a rotor with a permanent magnet embedded therein. Motor generator 6 receives kinetic energy generated by engine 2, converts it to electrical energy, and outputs it to electric power converter 18. Furthermore, motor generator 6 receives 3-phase alternate current electric power from electric power converter 18 and thereby generates driving force to start engine 2.

Motor generator 10 receives 3-phase alternate current electric power from electric power converter 20 and thereby generates a torque driving the vehicle. Furthermore, when the vehicle is braked or travels downhill and its acceleration is reduced or the like, motor generator 10 converts mechanical energy that is stored in the vehicle as kinetic energy, potential energy and the like to electrical energy and outputs it to electric power converter 20.

Engine 2 converts thermal energy generated as fuel burns to kinetic energy of a piston, a rotor and the like kinetic elements, and outputs the kinetic energy to power split device 4. For example, if the kinetic element is a piston and its motion is a reciprocatory motion, a so called cranking mechanism converts the reciprocatory motion to a rotational motion, and the piston's kinetic energy is thus transmitted to power split device 4. Note that the fuel for engine 2 is suitably gasoline, light oil, ethanol, liquid hydrogen, natural gas or a similar hydrocarbon fuel, or liquid or gaseous hydrogen fuel.

Fuel tank 22 reserves fuel received through fuel supplying port 102 and supplies the reserved fuel to engine 2. Note that an amount FUEL of fuel remaining in fuel tank 22 is sensed by a sensor (not shown) and its sensed value is output to ECU 26. Charger 24 operates in response to a signal PWM3 received from ECU 26 to convert electric power that is received from an external power supply through charging port 104 to a level in voltage of power storage device 16, and output it to power storage device 16.

ECU 26 generates signals PWM1, PWM2 for driving electric power converters 18, 20, respectively, and outputs the generated signals PWM1, PWM2 to electric power converters 18, 20, respectively. Furthermore, when ECU 26 receives a signal REQ requesting that charger 24 charge power storage device 16, ECU 26 generates signal PWM3 for driving charger 24 and outputs the generated signal PWM3 to charger 24.

Furthermore, ECU 26 controls a traveling mode of hybrid vehicle 100. More specifically, ECU 26 controls switching between stopping engine 2 and employing only motor generator 10 to cause the vehicle to travel (i.e., a motored traveling mode), and operating engine 2 to cause the vehicle to travel (i.e., a hybrid traveling mode). Hereinafter, the motored traveling mode and the hybrid traveling mode will also be referred to as "the EV mode" and "the HV mode", respectively.

Furthermore, ECU 26 uses amount FUEL of fuel remaining in fuel tank 22 and values as sensed of voltage VB and current IB of power storage device 16 in a method, as will be described later, to calculate a distance L1 (km/kWh) traveled per unit amount of electric power supplied from an external power supply by charger 24 and a distance L2 (km/l) traveled per unit amount of fuel consumed by engine 2. ECU 26 then outputs to notification unit 28 a signal DATA indicating distances L1, L2 calculated.

Notification unit 28 receives signal DATA from ECU 26 and operates in response thereto to notify the user of distance L1 traveled per unit amount of electric power supplied from the external power supply and distance L2 traveled per unit amount of fuel. Note that the notification may be done in any manner that can notify the user of distances L1, L2. For example, distances L1, L2 may be indicated visually or audibly.

Figure 3:
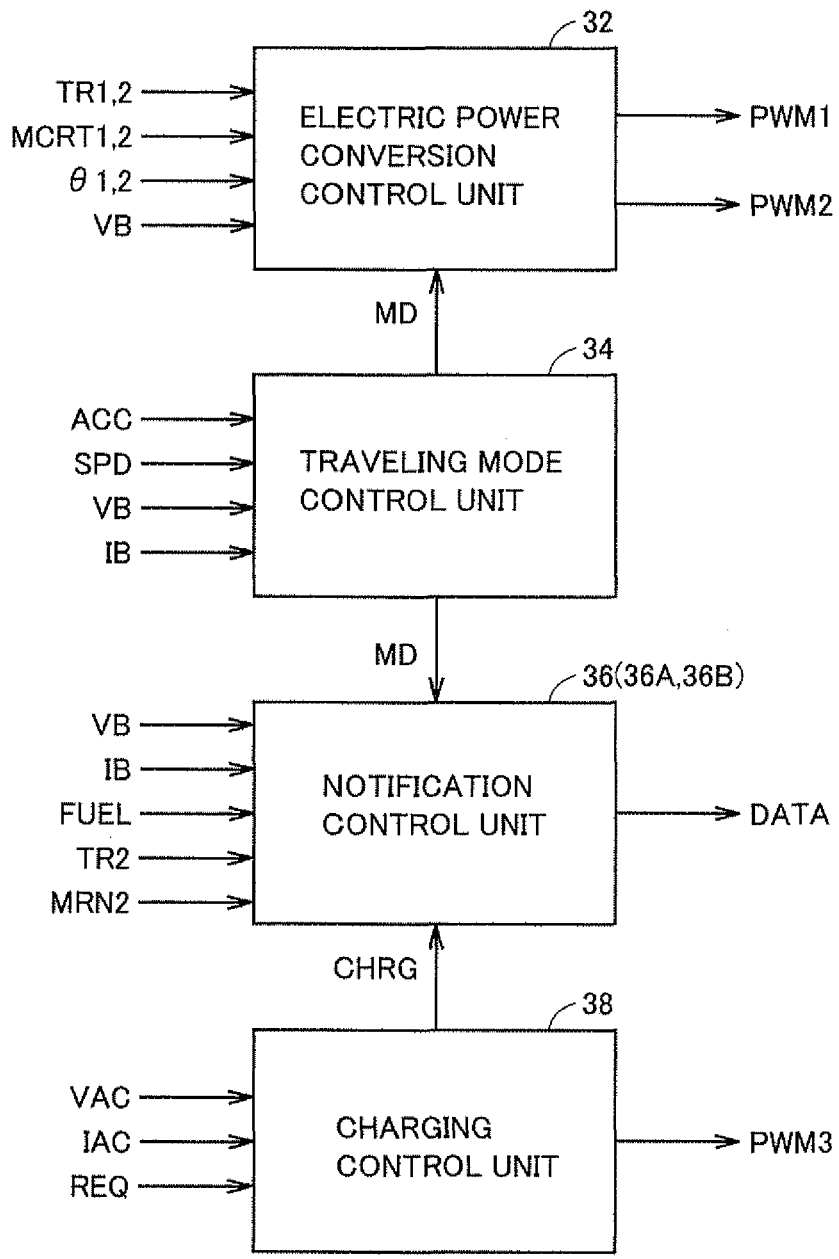
FIG. 3 is a functional block diagram of an ECU shown in FIG. 2.

FIG. 3 is a functional block diagram of ECU 26 shown in FIG. 2. With reference to FIG. 3, ECU 26 includes an electric power conversion control unit 32, a traveling mode control unit 34, a notification control unit 36, and a charging control unit 38. Electric power conversion control unit 32 receives torque control values TR1, TR2 for motor generators 6, 10, motor currents MCRT1, MCRT2 of the motors and their rotors' angles θ1, θ2, voltage VB of power storage device 16, and a mode signal MD received from traveling mode control unit 34 and indicating the vehicle's traveling mode (the EV mode/the HV mode), and operates in accordance therewith to generate signals PWM1, PWM2 for driving motor generators 6, 10, respectively, and output the generated signals PWM1, PWM2 to electric power converters 18, 20, respectively. Note that torque control values TR1, TR2 are calculated from an accelerator pedal position, the vehicle's speed and the like by a torque calculation unit (not shown). Motor currents MCRT1, MCRT2, the rotors' angles θ1, θ2 and voltage VB are each sensed by a sensor (not shown).

Traveling mode control unit 34 receives values of an accelerator pedal position signal ACC indicating an accelerator pedal position, a vehicular speed signal SPD indicating the vehicle's speed, and the power storage device 16 voltage VB and current IB, as sensed. Traveling mode control unit 34 uses the values as sensed of voltage VB and current IB to calculate the state of charge (SOC) of power storage device 16. Traveling mode control unit 34 then operates in response to accelerator pedal position signal ACC, vehicular speed signal SPD and the calculated SOC to calculate the value of an output that engine 2 is required to output, and a decision is made therefrom on whether the vehicle should travel in the EV mode or the HV mode.

Figure 4:
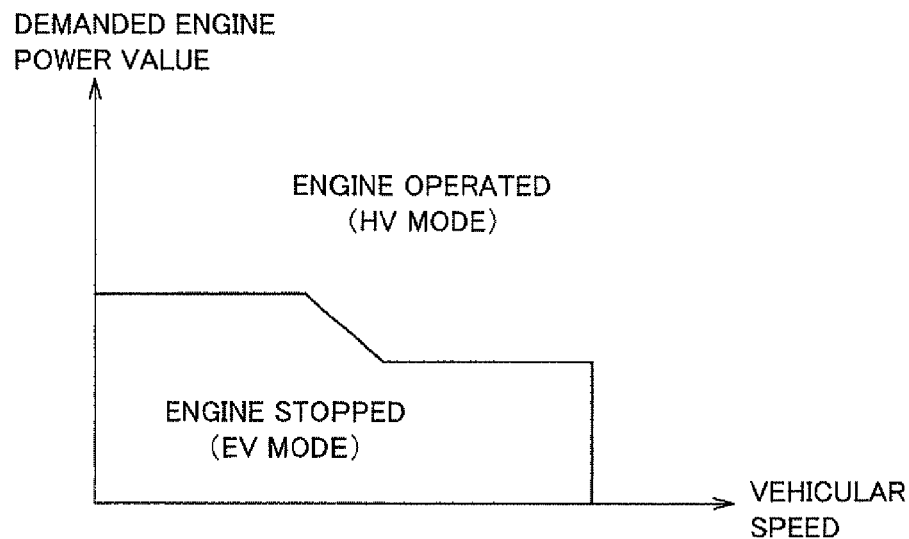
FIG. 4 is a diagram for illustrating switching of a traveling mode.

FIG. 4 is a diagram for illustrating switching of a traveling mode. With reference to FIG. 4, the axis of ordinates represents a value of an output that the engine is required to output, and the axis of abscissas represents the vehicle's speed. The solid line represents a threshold value for switching between the EV mode and the HV mode. When the value of an output that the engine is required to output is equal to or smaller than the threshold value, a decision is made that the vehicle travels with engine 2 stopped (or in the EV mode). When the value of an output that the engine is required to output is larger than the threshold value, a decision is made that the vehicle travels with engine 2 started (or in the HV mode). Note that the threshold value varies with the vehicle's speed. For example, it increases for low speed (i.e., the EV mode weighs), and is zeroed when the vehicle has a speed exceeding a defined value (i.e., the vehicle is normally in the HV mode).

Again with reference to FIG. 3, traveling mode control unit 34 generates mode signal MD indicating a traveling mode and outputs the signal to electric power conversion control unit 32 and notification control unit 36.

When signal REQ requesting that charger 24 charge power storage device 16 is active, charging control unit 38 uses a value sensed of each of a voltage VAC and a current IAC of electric power that is received through charging port 104 to generate signal PWM3 for driving charger 24 and output the signal to charger 24. Note that voltage VAC and current IAC are sensed by sensors (not shown), respectively. Furthermore, charging control unit 38 while power storage device 16 is charged from an external power supply generates a signal CHRG indicating that power storage device 16 is currently, externally charged, and outputs the signal to notification control unit 36.

Notification control unit 36 receives values of voltage VB and current IB of power storage device 16 and amount FUEL of fuel remaining in fuel tank 22, as sensed. Furthermore, notification control unit 36 receives values of motor generator 10's torque control value TR2 and motor speed MRN2 as sensed. Furthermore, notification control unit 36 receives mode signal MD and signal CHRG from traveling mode control unit 34 and charging control unit 38, respectively.

Notification control unit 36 then follows a structure for control, as will be described hereinafter, to calculate distance L1 traveled per unit amount of electric power supplied from an external power supply by charger 24 and distance L2 traveled per unit amount of fuel consumed by engine 2.

In other words, as hybrid vehicle 100 can externally be supplied with two types of energy, i.e., fuel and electric power, notification control unit 36 calculates a distance traveled per unit amount of each type of energy of fuel and electric power and outputs the resultant calculation as signal DATA to notification unit 28.

Note that to calculate a distance traveled per unit amount of each type of energy of fuel and electric power, notification control unit 36 divides an amount of electric power that power storage device 16 stores therein into an EV electric power storage CH1 and an HV electric power storage CH2 for management. More specifically, when the vehicle travels in the EV mode it is assumed to travel on electric power supplied from an external power supply, and furthermore, when the vehicle is braked or travels downhill and its acceleration is reduced or the like, motor generator 10 recovers regenerated electric power, which is also assumed as electric power supplied from an external power supply, converted to kinetic energy or potential energy, and partially reconverted to electrical energy, and notification control unit 36 thus manages by EV electric power storage CH1 an amount of electric power that is stored in power storage device 16 in the EV mode.

On the other hand, when the vehicle travels in the HV mode, the electric power generated by motor generator 6, the electric power consumed by motor generator 10 as the vehicle travels, and the regenerated electric power recovered by motor generator 10 when the vehicle is braked or travels downhill and its acceleration is reduced or the like are all assumed as electrical energy converted from fuel, and notification control unit 36 thus manages by HV electric power storage CH2 an amount of electric power that is stored in power storage device 16 in the HV mode.

Notification control unit 36 then divides a distance traveled in the EV mode by an amount of EV electric power storage CH1 reduced, to calculate distance L1 traveled per unit amount of electric power charged. Furthermore, notification control unit 36 converts in terms of fuel an amount of HV electric power storage CH2 varied, and uses that converted value to compensate for an amount of fuel actually used, to calculate an amount of fuel effectively used. Notification control unit 36 then divides a distance traveled in the HV mode by the amount of fuel effectively used, to distance L2 traveled per unit amount of fuel.

Figure 5:
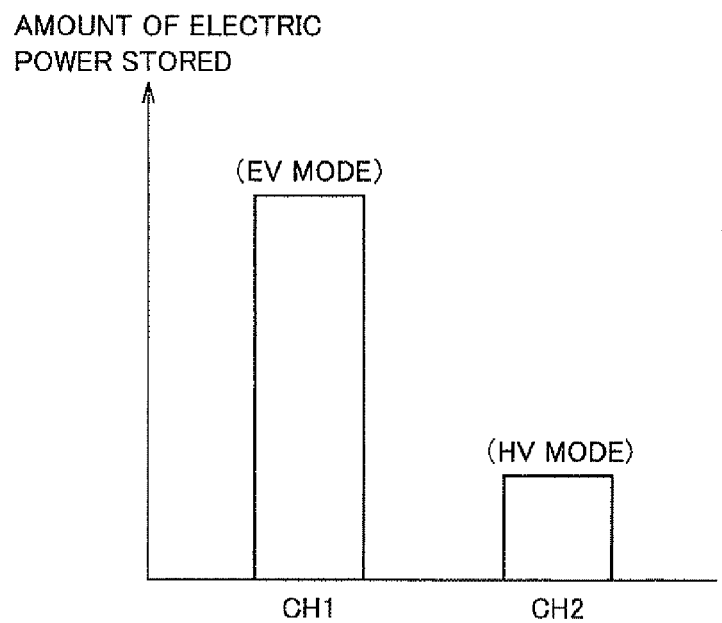
FIG. 5 conceptually shows an amount of electric power stored in a power storage device, as managed by the ECU shown in FIG. 2.

FIG. 5 conceptually shows an amount of electric power stored in power storage device 16, as managed by the ECU 26 shown in FIG. 2. With reference to FIG. 5, as has been described previously, power storage device 16 stores an amount of electric power therein, which is divided into EV electric power storage CH1 and HV electric power storage CH2 for management, and when an external power supply connected to charging port 104 charges power storage device 16 and when the vehicle travels in the EV mode, how electric power stored in power storage device 16 varies in amount is managed by EV electric power storage CH1, and on the other hand, when the vehicle travels in the HV mode, how electric power stored in power storage device 16 varies in amount is managed by HV electric power storage CH2.

An amount of EV electric power storage CH1 reduced corresponds to an amount of electric power supplied from an external power supply that is reduced, and an amount of HV electric power storage CH2 reduced corresponds to an amount of fuel required to generate electric power of that reduced amount by engine 2.

Figure 6:
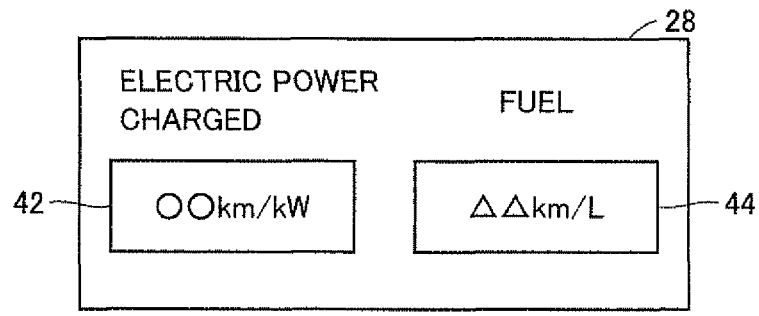
FIG. 6 shows one exemplary configuration of a notification unit shown in FIG. 2.

FIG. 6 shows one exemplary configuration of notification unit 28 shown in FIG. 2. With reference to FIG. 6, notification unit 28 includes indications 42, 44. Indication 42 indicates distance L1 (km/kWh) traveled per unit amount of electric power supplied from an external power supply by charger 24. Indication 44 indicates distance L2 (km/l) traveled per unit amount of fuel consumed by engine 2. The user can thus be notified of a distance traveled per unit amount of each type of energy (fuel/electric power) supplied from outside the vehicle.

Figure 7:
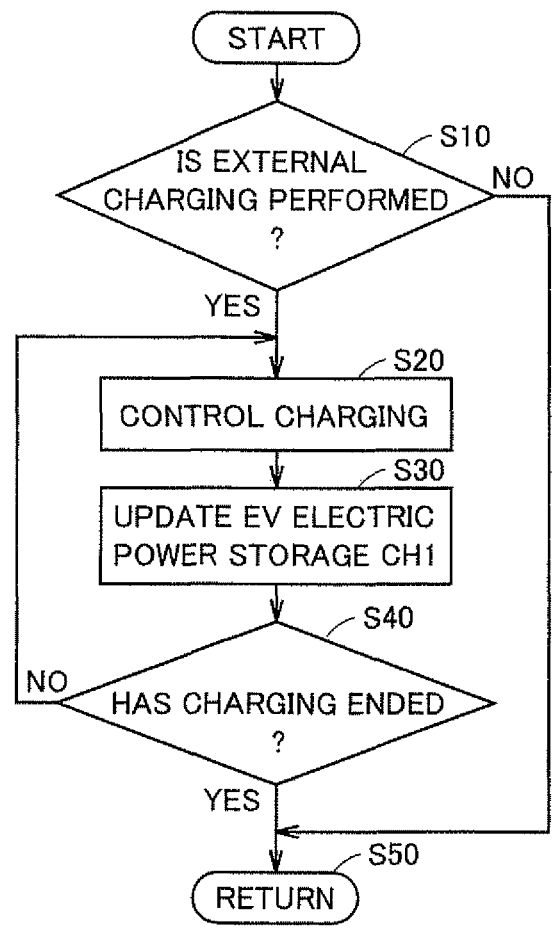
FIG. 7 is a flowchart generally illustrating a structure of a process performed by the ECU in charging a power storage device from an external power supply.

FIG. 7 is a flowchart generally illustrating a structure of a process performed by ECU 26 in charging power storage device 16 from an external power supply. Note that this flowchart's process is executed for each predetermined time or whenever a predetermined condition is established.

With reference to FIG. 7, ECU 26 operates in response to signal REQ requesting that charger 24 charge power storage device 16 to determine whether power storage device 16 should be charged by charger 24 from an external power supply connected to charging port 104 (step S10). If ECU 26 determines that power storage device 16 should be charged (YES in step S10), ECU 26 generates signal PWM3 for driving charger 24 and outputs the signal to charger 24 to charge power storage device 16 (step S20).

In doing so, ECU 26 uses the values of current IB and voltage VB of power storage device 16 to calculate electric power supplied to power storage device 16 to charge it, and updates EV electric power storage CH1 based on the electric power charged, as calculated (step S30). More specifically, ECU 26 adds to EV electric power storage CH1 an amount of electric power charged, as calculated.

Then, ECU 26 determines whether charging power storage device 16 has ended (step S40). If not, (NO in step S40), ECU 26 returns to step S20. If ECU 26 determines that charging has ended (YES in step S40), ECU 26 proceeds to step S50, and a series of steps thus ends.

Figure 8:
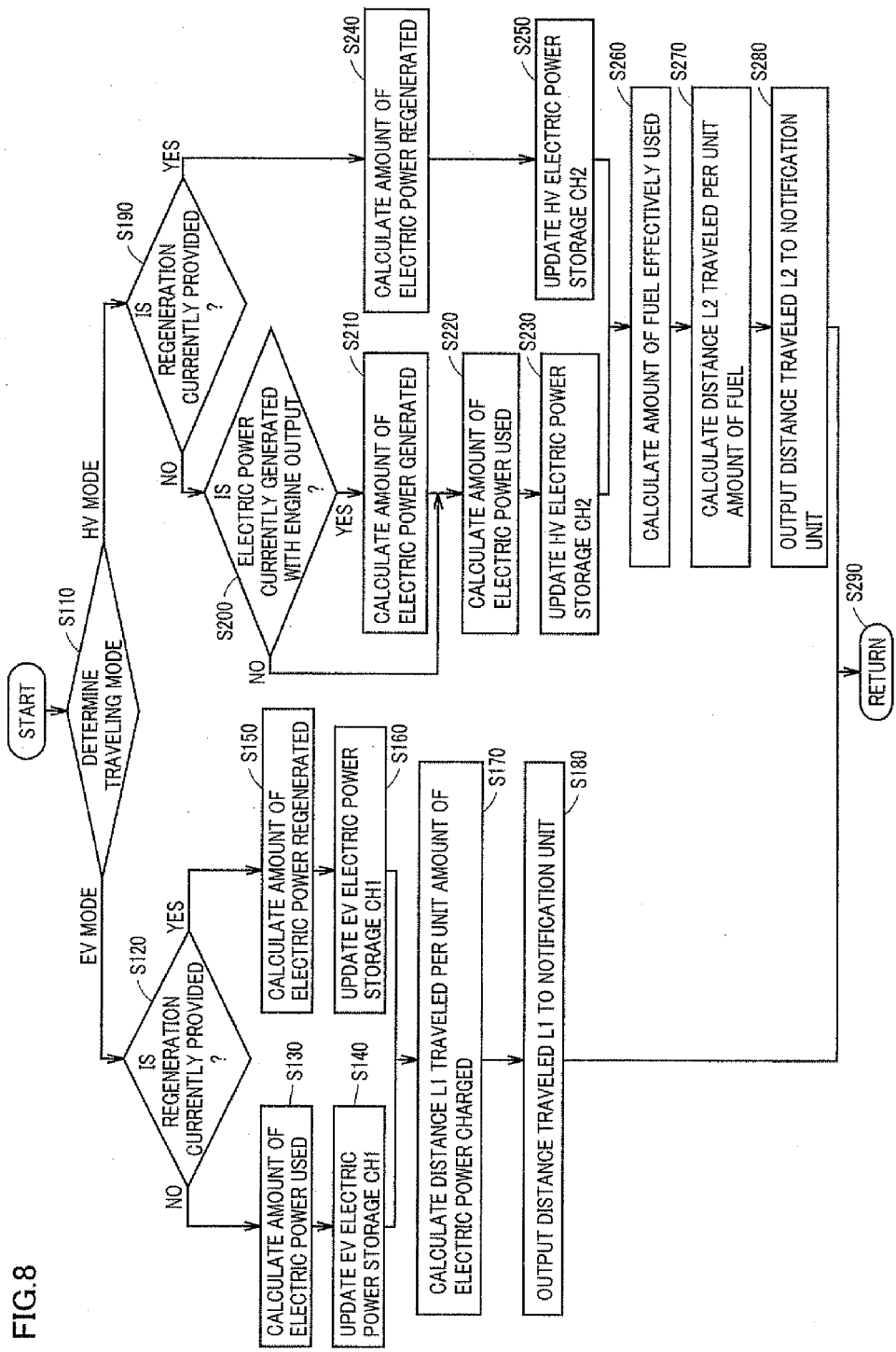
FIG. 8 is a flowchart illustrating a structure of a process performed by the ECU shown in FIG. 2 for calculating a distance traveled per unit amount of energy.

FIG. 8 is a flowchart illustrating a structure of a process performed by ECU 26 shown in FIG. 2 for calculating a distance traveled per unit amount of energy. Note that this flowchart's process is called from a main routine and executed for each predetermined time or whenever a predetermined condition is established while the vehicle is travelable (e.g., while a vehicular system is started).

With reference to FIG. 8, ECU 26 operates in accordance with accelerator pedal position signal ACC, vehicular speed signal SPD and the SOC of power storage device 16 to calculate the value of an output that engine 2 is required to provide, and therefrom ECU 26 determines whether the vehicle should travel in the EV mode or the HV mode (step S110).

If ECU 26 determines that the vehicle should travel in the EV mode ("EV mode" in step S110), ECU 26 determines from motor generator 10's torque control value TR2 and motor speed MRN2 whether motor generator 10 currently regeneratively operates (step S120). More specifically, when motor generator 10 has a torque in a direction and rotates in a different direction, i.e., when torque control value TR2 and motor speed MRN2 are different in sign, ECU 26 determines that motor generator 10 currently regeneratively operates.

If in step S120 ECU 26 determines that motor generator 10 currently does not regeneratively operate (NO in step S120), ECU 26 calculates an amount of electric power used by motor generator 10 (step S130). Note that the amount of electric power used by motor generator 10 may be calculated from motor generator 10's motor voltage and motor current, or the power storage device 16 voltage VB and current IB may be used to calculate electric power discharged from power storage device 16 and the calculated value may be used as the amount of electric power used by motor generator 10. Then, ECU 26 subtracts the amount of electric power used by motor generator 10, as calculated, from EV electric power storage CH1 to update EV electric power storage CH1 (step S140).

If in step S120 ECU 26 determines that motor generator 10 currently regeneratively operates (YES in step S120), ECU 26 calculates an amount of electric power regenerated by and output from motor generator 10 (step S150). Note that the amount of electric power regenerated by motor generator 10 may be calculated from motor generator 10's motor voltage and motor current, or power storage device 16's voltage VB and current IB may be used to calculate electric power charged to power storage device 16 and the obtained calculation may be used as the amount of electric power regenerated by motor generator 10. Then, ECU 26 adds the amount of electric power regenerated by motor generator 10, as calculated, to EV electric power storage CH1 to update EV electric power storage CH1 (step S160).

Then, ECU 26 divides a distance traveled in the EV mode by an amount of EV electric power storage CH1 reduced, to calculate distance L1 traveled per unit amount of electric power supplied by charger 24 from an external power supply (step S170). More specifically, after charging ends when the vehicle starts to travel ECU 26 starts to count a distance traveled in the EV mode and divides the traveled distance by an amount of EV electric power storage CH1 reduced after the vehicle starts to travel as described above, to calculate distance L1 traveled per unit amount of electric power charged.

Note that the distance traveled in the EV mode can be calculated for example from the vehicular wheel's rate of rotation with the vehicle traveling in the EV mode and the vehicular wheel's circumference, or may be calculated from car navigation information or other information such as the vehicle's positional information. A distance traveled in the HV mode, as will be described later, can also be calculated similarly.

Once distance L1 has been calculated, ECU 26 outputs distance L1, as calculated, to notification unit 28 (step S180). The user can thus be notified of a distance traveled per unit amount of electric power supplied from an external power supply (or electric power charged), and the distance corresponds to energy economy.

If in step S110 ECU 26 determines that the vehicle should travel in the HV mode ("HV mode" in step S110), ECU 26 determines from torque control value TR2 and motor speed MRN2 whether motor generator 10 currently regeneratively operates (step S190).

If in step S190 ECU 26 determines that motor generator 10 currently does not regeneratively operate (NO in step S190), ECU 26 uses an output of engine 2 to determine whether motor generator 6 is currently generating electric power (step S200). If so (YES in step S200), ECU 26 calculates an amount of electric power generated by motor generator 6 (step S210). Note that the amount of electric power generated by motor generator 6 can for example be calculated from motor generator 6's motor voltage and motor current. If in step S200 ECU 26 determines that motor generator 6 is currently not generating electric power (NO in step S200), ECU 26 proceeds to step S220.

Subsequently, ECU 26 calculates an amount of electric power used by motor generator 10 (step S220). ECU 26 then updates HV electric power storage CH2 by the amount of electric power generated by motor generator 6, as calculated in step S210, and that of electric power used by motor generator 10, as calculated in step S220 (step S230). More specifically, ECU 26 adds the amount of electric power generated, as calculated in step S210, to HV electric power storage CH2 and subtracts that of electric power used, as calculated in step S220, from HV electric power storage CH2 to update HV electric power storage CH2.

If in step S190 ECU 26 determines that motor generator 10 currently regeneratively operates (YES in step S190), ECU 26 calculates an amount of electric power regenerated and output from motor generator 10 (step S240), and ECU 26 adds the amount of electric power regenerated, as calculated, to HV electric power storage CH2 to update HV electric power storage CH2 (step S250).

Then, ECU 26 converts how HV electric power storage CH2 varies in amount in terms of fuel (with an increase indicated by a positive value), and ECU 26 subtracts the converted value from an amount of fuel actually used, to calculate an amount of fuel effectively used (step S260). More specifically, ECU 26 for example refers to a relationship between an amount of fuel used and an amount of electric power generated when motor generator 6 generates electric power, and therefrom ECU 26 obtains a scaling factor used to convert a variation in amount of HV electric power storage CH2 in terms of fuel and uses the scaling factor to convert the variation in amount of HV electric power storage CH2 in terms of fuel. Furthermore, ECU 26 receives a value of amount FUEL of fuel remaining in fuel tank 22, as sensed, and therefrom calculates an amount of fuel actually used by engine 2, and ECU 26 subtracts the variation in amount of HV electric power storage CH2, as converted in terms of fuel, from the amount of fuel actually used, to calculate an amount of fuel effectively used. Note that the amount of fuel actually used by engine 2 may be calculated for example by integrating amounts of fuel that an injector injects or similarly obtaining a flow rate in a fuel path.

Once in step S260 an amount of fuel effectively used is calculated, ECU 26 divides the distance traveled in the HV mode by the amount of fuel effectively used, to calculate distance L2 traveled per unit amount of fuel (step S270). Once distance L2 is calculated, ECU 26 outputs distance L2, as calculated, to notification unit 28 (step S280). The user can thus be notified of a distance traveled by hybrid vehicle 100 per unit amount of fuel (i.e., the vehicle's fuel economy).

Thus in the first embodiment hybrid vehicle 100 allows power storage device 16 to be charged by charger 24 from an external power supply, and distance L1 traveled per unit amount of electric power charged and distance L2 traveled per unit amount of fuel can be calculated and indicated to a user. The user can thus be notified of a distance traveled per unit amount of each type of energy (i.e., fuel and electric power) supplied from outside the vehicle.

Second Embodiment

In a second embodiment a user is notified of a cost of traveling on electric power supplied from an external power supply and thus charged and that of traveling on fuel. In other words, a cost of traveling in the EV mode and that of traveling in the HV mode are presented to the user.

With reference again to FIG. 2 and FIG. 3, the second embodiment provides a hybrid vehicle 100A corresponding to the first embodiment's hybrid vehicle 100 configured with ECU 26 and notification unit 28 replaced with an ECU 26A and a notification unit 28A, respectively.

ECU 26A corresponds to the first embodiment's ECU 26 configured with notification control unit 36 replaced with a notification control unit 36A. Notification control unit 36A follows a structure for control, as will be described hereinafter, to calculate a cost C1 of traveling in the EV mode and a cost C2 of traveling in the HV mode. More specifically, cost C1 is a cost, per unit distance traveled, of electric power supplied from an external power supply (yen/km) and cost C2 is a cost of fuel per unit distance traveled (yen/km).

More specifically, notification control unit 36A divides a unit price of electric power supplied from the external power supply (yen/kWh) by distance L1 as described above (km/kWh) to calculate cost C1 (yen/km). Furthermore, notification control unit 36A divides a unit price of fuel (yen/l) by distance L2 described above (km/l) to calculate cost C2 (yen/km). Notification control unit 36A then outputs costs C1, C2, as calculated, as signal DATA to notification unit 28A.

Note that the unit price of electric power supplied from the external power supply and that of fuel may be obtained wirelessly from an external server having information of a unit price of energy, or may be settable by the user. Furthermore, the unit price of electric power may be obtained from outside the vehicle through a communication system constructed to use a charging electric power line as a communication line to obtain the unit price of electric power through the electric power line when the vehicle is charged from the external power supply. The unit price of electric power and the unit price of fuel as parameters are stored in a storage unit (not shown).

Notification unit 28A receives signal DATA from ECU 26A and in accordance therewith notifies the user of cost C1 of traveling in the EV mode and cost C2 of traveling in the HV mode. Note that the notification may be done in any manner that can notify the user of costs C1, C2. For example, costs C1, C2 may be indicated visually or audibly.

Note that hybrid vehicle 100A has a remainder in configuration identical to hybrid vehicle 100 of the first embodiment.

Figure 9:
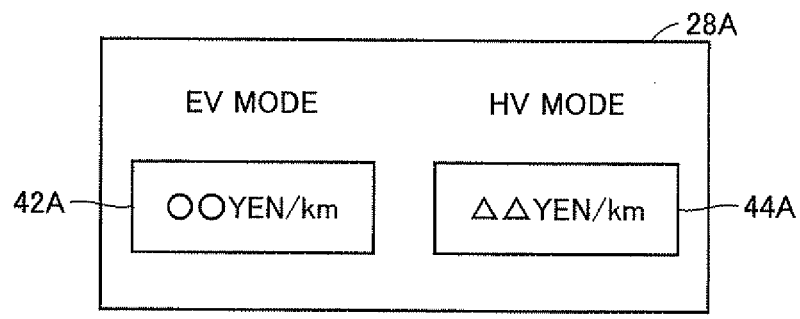
FIG. 9 shows one exemplary configuration of a notification unit in a second embodiment.

FIG. 9 shows one exemplary configuration of notification unit 28A in the second embodiment. With reference to FIG. 9, notification unit 28A includes indications 42A, 44A. Indication 42A indicates cost C1 of traveling in the EV mode (yen/km). Indication 44A indicates cost C2 of traveling in the HV mode (yen/km). The user can thus be notified of a cost (yen/km) of traveling for each type of energy (electric power/fuel) supplied from outside the vehicle.

Figure 10:
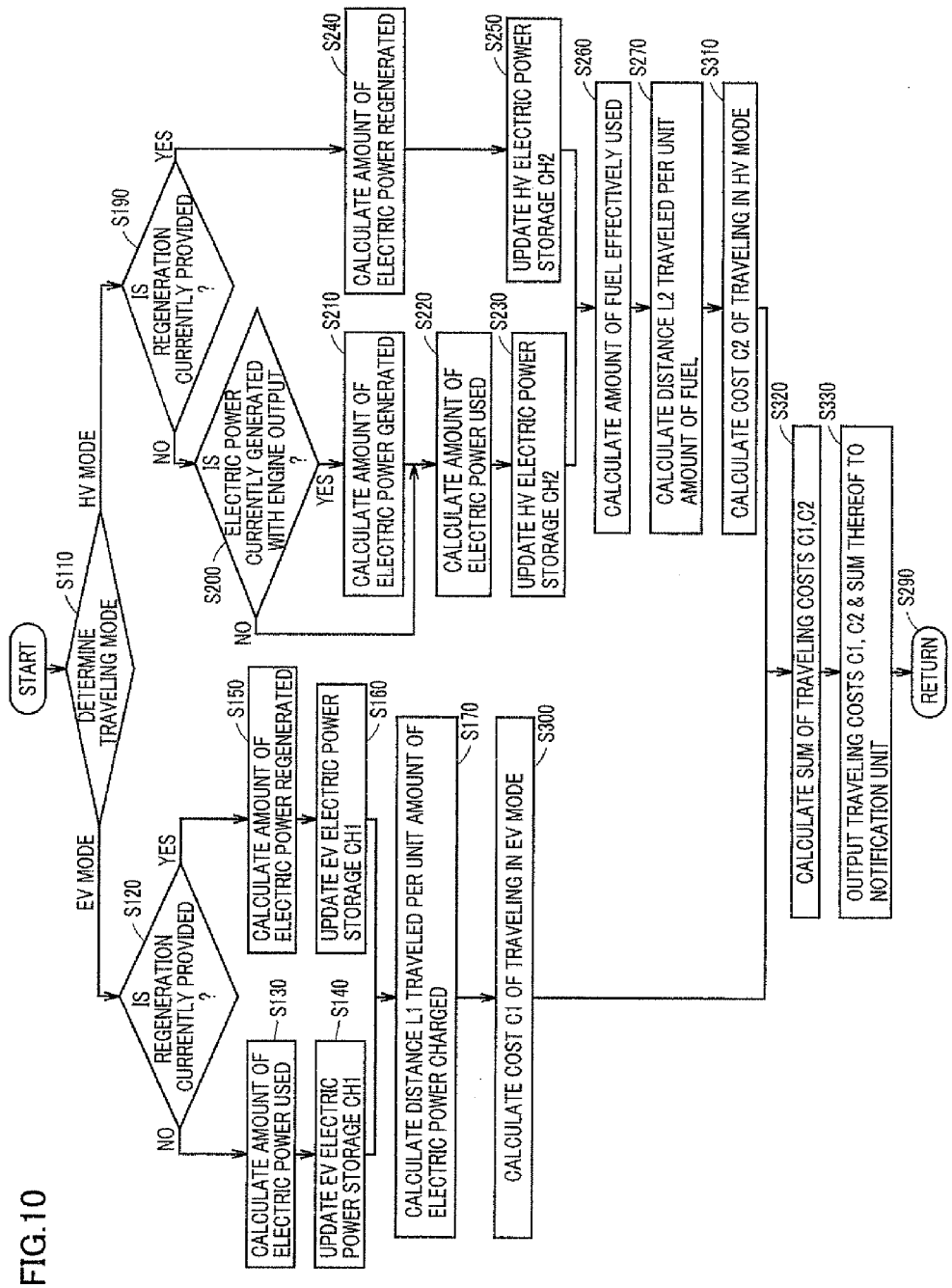
FIG. 10 is a flowchart illustrating a structure of a process performed in the second embodiment by the ECU for calculating a traveling cost.

FIG. 10 is a flowchart illustrating a structure of a process performed in the second embodiment by ECU 26A for calculating a traveling cost. Note that this flowchart's process is also called from a main routine and executed for each predetermined time or whenever a predetermined condition is established while the vehicle is travelable (e.g., while a vehicular system is started).

With reference to FIG. 10, this flowchart corresponds to the FIG. 8 flowchart having steps S180, S280 replaced with steps S300, S310, respectively, and further including steps S320, S330. More specifically, in step S170, distance L1 traveled per unit amount of electric power charged is calculated, and ECU 26A divides a unit price of electric power supplied from an external power supply (yen/kWh) by distance L1 (km/kWh), as calculated, to calculate a cost of traveling per unit distance traveled, i.e., cost C1 of traveling in the EV mode (yen/km) (step S300).

Furthermore, in step S270, distance L2 traveled per unit amount of fuel is calculated, and ECU 26A divides a unit price of fuel (yen/l) by distance L2 (km/l), as calculated, to calculate a cost of traveling per unit distance traveled, i.e., cost C2 of traveling in the HV mode (yen/km) (step S310).

Furthermore, ECU 26A adds costs C1, C2, as calculated, together to calculate a total energy economy of hybrid vehicle 100A (step S320), and outputs to notification unit 28A costs C1, C2 calculated in steps S300, S310, respectively, and the sum of costs C1, C2 calculated in step S320 (step S330). The user can thus be notified of a cost (yen/km) of traveling for each type of energy (electric power/fuel) supplied from outside the vehicle.

Note that although not shown, notification unit 28A can indicate costs C1, C2 individually as well as costs C1, C2 added together.

Thus in the second embodiment cost C1, per unit distance traveled, of electric power supplied from an external power supply and cost C2 of fuel per unit distance traveled can be calculated and indicated to the user. The user can thus be notified of a cost of traveling for each type of energy (electric power/fuel) supplied from outside the vehicle.

Third Embodiment

In a third embodiment an amount of $CO_2$ emitted for traveling in the EV mode and that of $CO_2$ emitted in traveling in the HV mode are indicated to the user.

With reference again to FIG. 2 and FIG. 3, the third embodiment provides a hybrid vehicle 100B corresponding to the first embodiment's hybrid vehicle 100 configured with ECU 26 and notification unit 28 replaced with an ECU 26B and a notification unit 28B, respectively.

ECU 26B corresponds to the first embodiment's ECU 26 configured with notification control unit 36 replaced with a notification control unit 36B. Notification control unit 36B follows a structure for control, as will be described hereinafter, to calculate an amount EM1 of $CO_2$ emitted for traveling in the EV mode and an amount EM2 of $CO_2$ emitted in traveling in the HV mode. More specifically, amount EM1 of $CO_2$ emitted is an amount of $CO_2$ emitted, per unit distance traveled, for traveling on electric power supplied from an external power supply (g/km), and amount EM2 of $CO_2$ emitted is an amount of $CO_2$ emitted per unit distance traveled in traveling on fuel (g/km).

More specifically, notification control unit 36B divides an amount of $CO_2$ emitted in generating electric power supplied from an external power supply (g/kWh) by distance L1 described above (km/kWh) to calculate amount EM1 of $CO_2$ emitted (g/k). Furthermore, notification control unit 36B divides an amount of $CO_2$ emitted in consuming fuel (g/l) by distance L2 described above (km/l) to calculate amount EM2 of $CO_2$ emitted (g/km). Notification control unit 36B then outputs amounts EM1, EM2 of $CO_2$ emitted, as calculated, as signal DATA to notification unit 28B.

Note that the amount of $CO_2$ emitted in generating electric power supplied from the external power supply (g/kWh) and the amount of $CO_2$ emitted in consuming fuel (g/l) may be obtained wirelessly from an external server having information of $CO_2$ emission, or may be settable by the user. Furthermore, the amount of $CO_2$ emitted in generating electric power supplied from the external power supply may be obtained from outside the vehicle through a communication system constructed to use a charging electric power line as a communication line to obtain the amount through the electric power line when the vehicle is charged from the external power supply. The amount of $CO_2$ emitted in generating electric power supplied from the external power supply and the amount of $CO_2$ emitted in consuming fuel, as parameters, are stored in a storage unit (not shown). Note that the amount of $CO_2$ emitted in consuming fuel depends on the vehicle's traveling state. Accordingly it may be calculated in the vehicle.

Notification unit 28B receives signal DATA from ECU 26B and in accordance therewith notifies the user of amount EM1 of $CO_2$ emitted for traveling in the EV mode and amount EM2 of $CO_2$ emitted in traveling in the HV mode. Note that the notification may be done in any manner that can notify the user of amounts EM1, EM2 of $CO_2$ emitted. For example, amounts EM1, EM2 of $CO_2$ emitted may be indicated visually or audibly.

Note that hybrid vehicle 100E has a remainder in configuration identical to hybrid vehicle 100 of the first embodiment.

Figure 11:
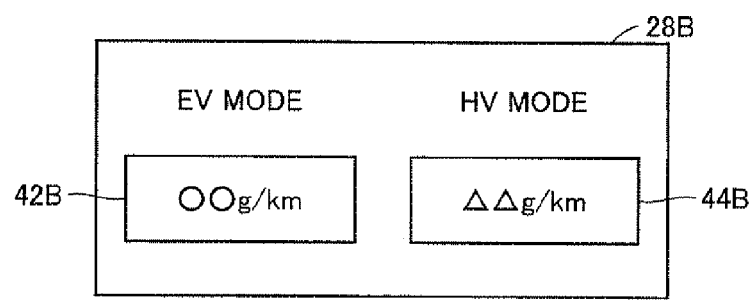
FIG. 11 shows one exemplary configuration of a notification unit in a third embodiment.

FIG. 11 shows one exemplary configuration of notification unit 28B in the third embodiment. With reference to FIG. 11, notification unit 28B includes indications 42B, 44B. Indication 42B indicates amount EM1 of $CO_2$ emitted for traveling in the EV mode (g/km). Indication 44B indicates amount EM2 of $CO_2$ emitted in traveling in the HV mode (g/km). The user can thus be notified of an amount of $CO_2$ emitted (g/km) for each type of energy (electric power/fuel) supplied from outside the vehicle.

Figure 12:
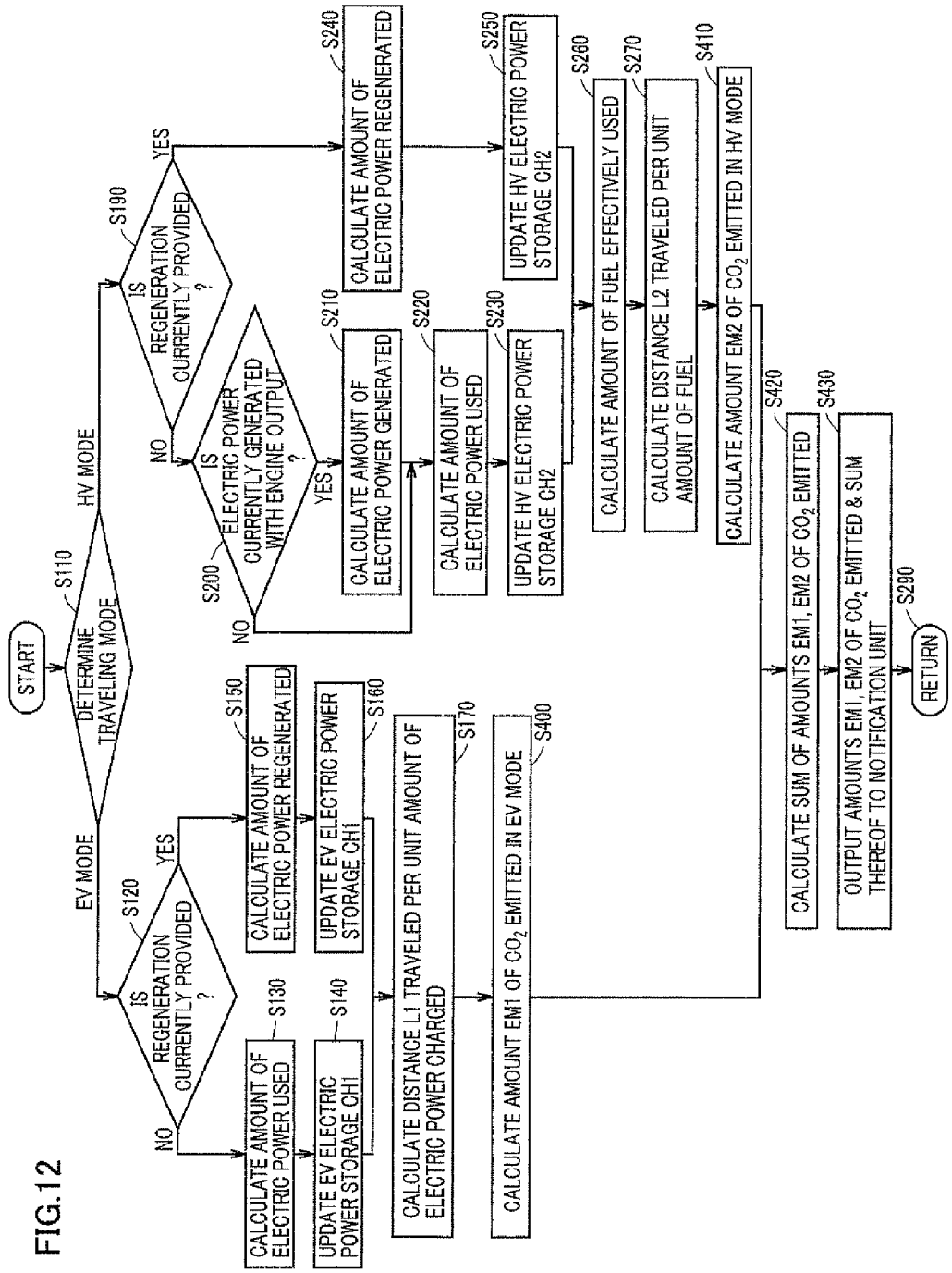
FIG. 12 is a flowchart illustrating a structure of a process performed in the third embodiment by the ECU for calculating an amount of $CO_2$ emitted.

FIG. 12 is a flowchart illustrating a structure of a process performed in the third embodiment by ECU 26B for calculating an amount of $CO_2$ emitted. Note that this flowchart's process is also called from a main routine and executed for each predetermined time or whenever a predetermined condition is established while the vehicle is travelable (e.g., while a vehicular system is started).

With reference to FIG. 12, this flowchart corresponds to the FIG. 8 flowchart having steps S180, S280 replaced with steps S400, S410, respectively, and further including steps S420, S430. More specifically, in step S170, distance L1 traveled per unit amount of electric power charged is calculated, and ECU 26B divides an amount of $CO_2$ emitted in generating electric power supplied from an external power supply (g/kWh) by distance L1 (km/kWh), as calculated, to calculate an amount of $CO_2$ emitted per unit distance traveled, i.e., amount EM1 of $CO_2$ emitted for traveling in the EV mode (g/km) (step S400).

Furthermore, in step S270, distance L2 traveled per unit amount of fuel is calculated, and ECU 2613 divides an amount of $CO_2$ emitted in consuming fuel (g/l) by distance L2 (km/l), as calculated, to calculate an amount of $CO_2$ emitted per unit distance traveled, i.e., amount EM2 of $CO_2$ emitted in traveling in the HV mode (g/km) (step S410).

Furthermore, ECU 26B adds amounts EM1, EM2 of $CO_2$ emitted, as calculated, together to calculate a total amount of $CO_2$ emitted for hybrid vehicle 100B (step S420), and outputs to notification unit 28B amounts EM1, EM2 of $CO_2$ emitted, as calculated in steps S400, S410, respectively, and amounts EM1, EM2 of $CO_2$ emitted, as added together in step S420 (step S430). The user can thus be notified of an amount of $CO_2$ emitted (g/km) for each type of energy (electric power/fuel) supplied from outside the vehicle.

Note that although not shown, notification unit 28B can indicate individually amounts EM1, EM2 of $CO_2$ emitted as well as those added together.

Thus in the third embodiment amount EM1 of $CO_2$ emitted, per unit distance traveled, attributed to electric power supplied from an external power supply and amount EM2 of $CO_2$ emitted per unit distance traveled on fuel can be calculated and indicated to the user. The user can thus be notified of an amount of $CO_2$ emitted for each type of energy (electric power and fuel) supplied from outside the vehicle.

Note that in the first embodiment a distance traveled per unit amount of fuel is calculated and indicated to the user.

Alternatively, a reciprocal thereof may be obtained and the user may be notified of an amount of fuel required to travel a predetermined distance (for example of 100 km). Similarly, the second embodiment may be modified to notify the user of an amount of fuel for a predetermined traveling cost, or the third embodiment may be modified to notify the user of an amount of fuel for a predetermined amount of $CO_2$ emitted.

Furthermore, it can be said in the second embodiment that a unit price of electric power and a unit price of fuel serve as correction factors or parameters to present fuel and electric power that are represented in physical quantities of different measures, i.e., in litters and kWh, respectively, by a common measure, i.e., a traveling cost (yen/km), and provide them to the user. Furthermore, it can be said in the third embodiment that an amount of $CO_2$ emitted in generating electric power supplied from an external power supply and that of $CO_2$ emitted in consuming fuel serve as correction factors or parameters to present fuel and electric power that are represented in physical quantities of different measures, i.e., in litters and kWh, respectively, by a common measure, i.e., an amount of $CO_2$ emitted (g/km), and provide them to the user. Furthermore, the correction factors (or parameters) are not limited thereto, and may be any that can serve as a correction factor (or parameter) to present physical quantities of energy sources different from each other or physical quantities different for different traveling modes by a common measure, such as a traveling cost, an amount of $CO_2$ consumed (represented in weight, mass or the like) and energy (kWh).

Note that the correction factors (or parameters) may be stored in the vehicle previously, or may be input externally. The correction factors (or parameters) may be input externally by the user operating a console, or from a charging device external to the vehicle, a server, or the like wirelessly or through wired communication for example before, while or after the vehicle is charged from an external power supply.

Note that while in the above embodiments fuel is represented in litters, it may alternatively be represented in gallons, moles or any other units allowing relative comparison. Furthermore, while in the above embodiments distance is represented in meters, it may also be represented in miles or any other units allowing relative comparison. Furthermore, while electric power is represented preferably in watt-hour (Wh), it may be represented in watts (W) or volt-ampere (VA).

Furthermore, while in the above embodiments the user is notified separately of a physical quantity (such as a traveling cost, an amount of $CO_2$ emitted, or the like) involved in consuming electric power and a physical quantity involved in consuming fuel, the user may alternatively be notified of a value representing their summation or difference.

Furthermore, the user may be notified of a physical quantity indicating an effect of reducing an amount of energy consumption as the vehicle is externally charged. For example, a physical quantity (e.g., a traveling cost, an amount of $CO_2$ emitted, or the like) involved when the vehicle travels without being externally charged and accordingly, travels only on fuel, is calculated, and the resultant calculation minus the physical quantity above involved in actually traveling may be indicated to the user to notify the user of an amount of cost reduced, an amount of environmental load reduced or the like as an effect, or in contrast as a loss caused as the vehicle is not charged externally.

Furthermore, while in the above embodiments a physical quantity (such as an amount of fuel consumed, an amount of electric power consumed, a traveling cost, an amount of $CO_2$ emitted, and the like) involved in consuming energy per unit distance traveled is indicated (note that the first embodiment can also be regarded as informing an amount of fuel consumed per unit distance traveled and an amount of electric power consumed per unit distance traveled), a physical quantity (such as an amount of fuel consumed, an amount of electric power consumed, a traveling cost, an amount of $CO_2$ emitted, and the like) involved in a total amount consumed after the vehicle starts to travel, the user resets, or a predetermined condition is established, may alternatively be indicated.

Furthermore, in the second and third embodiments, physical quantities different in scale for different types of energy are resealed by a single scale and thus indicated to the user to enable the user to compare them. Alternatively, physical quantities different in scale for different types of energy may be resealed by a single scale and subsequently added together and the obtained summation may be indicated to the user. This allows the user to be provided for example with: a summation of $CO_2$ generated as fuel is consumed and $CO_2$ generated as electric power is consumed; a total cost to be paid as fuel and electric power are consumed; and the like.

Similarly, in the second and third embodiments, physical quantities different in scale for different traveling modes are resealed by a single scale and thus indicated to the user to enable the user to compare them. Alternatively, physical quantities different in scale for different traveling modes may be resealed by a single scale and subsequently added together and the obtained summation may be indicated to the user. This allows the user to be provided for example with: a summation of $CO_2$ generated as the vehicle travels in the EV mode and $CO_2$ generated as the vehicle travels in the HV mode; a total cost of energy required in traveling in the EV mode and energy required in traveling in the HV mode; and the like.

Furthermore, an average of energy economy in traveling in the EV mode and that in traveling in the HV mode may be calculated and together indicated to the user. In that case, an average value of energy economy in traveling in the EV mode and that in traveling in the HV mode may simply be calculated. Preferably, it is calculated with a weighting introduced so that the energy economy in traveling in that one of the EV and HV modes in which the vehicle travels a longer distance has a larger effect. For example, a total distance traveled in the two traveling modes and a total amount (or cost) of energy consumed therein may be calculated and their ratio may be obtained.

Furthermore, energy economy may be calculated such that average energy economy for a predetermined unit period of time is calculated whenever the unit period of time elapses. Alternatively, it may be an average energy economy calculated for at least one of: a zone (or a period of time) designated by the user; after a geographical (or temporal) point reset by the user; and after the vehicle starts to travel (e.g., ignition, a start button or the like is turned on). Herein, the above plurality of average energy economies may be calculated in parallel and an average energy economy that the driver designates may selectively be indicated (for example by switching one indication to another) to the user. In that case, a distance traveled, an amount of fuel used and/or the like that correspond(s) to each average energy economy may together be indicated. Furthermore, preferably, resetting energy economy in traveling in the EV mode and resetting that in traveling in the HV mode can be done for example by the same operation (for example with a reset button).

Furthermore, a physical quantity (such as a distance traveled, a traveling cost, an amount of $CO_2$ emitted, and the like) involved in traveling in the EV mode and that involved in traveling in the HV mode may selectively be switched, depending on the traveling mode that is active when the user is notified, to the physical quantity corresponding to that traveling mode, and may thus be indicated. For example, while the vehicle is traveling in the EV mode, the user may be notified of energy economy in traveling in the EV mode, and when the vehicle travels in the HV mode, switching may be done to energy economy in traveling in the HV mode and the user may be notified thereof.

Furthermore, in the above embodiments, an amount of electric power stored in power storage device 16 in the EV mode is managed by EV electric power storage CH1 and an amount of electric power stored in power storage device 16 in the HV mode is managed by HV electric power storage CH2, and preferably, information (such as an absolute amount, a ratio or the like) allowing EV electric power storage CH1 and HV electric power storage CH2 to be identified is also stored for example in a non volatile memory after the vehicle has turned off its standby state for traveling.

Furthermore while in the above embodiments power storage device 16 is charged from an external power supply via charger 24 dedicated thereto, power storage device 16 may be charged in a different manner. For example, a pair of electric power lines connected to charging port 104 may be connected to motor generators 6, 10 at their neutral points and the electric power received from an external power supply and passed through charging port 104 to motor generators 6, 10 at their neutral points may be converted by electric power converters 18, 20 and thus charged to power storage device 16.

Furthermore while the embodiments have been described for a hybrid vehicle of a series/parallel type employing power split device 4 to allow the power of engine 2 to be split to a transmission gear and motor generator 6 and thus transmitted, the present invention is also applicable to different types of hybrid vehicles. More specifically, the present invention is applicable for example to: a so called series type hybrid vehicle that employs engine 2 only for driving motor generator 6 and generates force only by motor generator 10 for driving the vehicle; a hybrid vehicle recovering only regenerated energy of kinetic energy that is generated by engine 2 as electrical energy; and a motor-assisted hybrid vehicle having an engine as a major power source and a motor as an assistant as required.

Furthermore, the present invention is not limited to hybrid vehicles externally supplied with electric power and fuel. For example, the present invention is also applicable to a so called bi-fuel vehicle supplied with ethanol (first energy) and gasoline (second energy). That is, the present invention is applicable to any vehicles that can externally be supplied with different types of energy and travel thereon, and the motor generator, power storage device and the like mentioned above are not essential to the present invention. Note that in the above embodiments fuel can be regarded as the first energy and electric power can be regarded as the second energy.

Note that in the above description the control assumed by ECUs 26, 26A, 26B is in effect done by a central processing unit (CPU), and the CPU reads from a read only memory (ROM) a program including each step of the FIGS. 8, 10, 12 flowcharts and executes the read program to perform a process in accordance with the flowcharts. Accordingly, the ROM corresponds to a computer (CPU) readable storage medium having stored thereon the program including each step of the flowcharts.

Note that in the above description charger 24 corresponds in the present invention to one embodiment of a "charging device", notification control unit 36, 36A, 36B corresponds in the present invention to one embodiment of a "calculation unit". Furthermore, engine 2 corresponds in the present invention to one embodiment of an "internal combustion engine" and motor generator 10 corresponds in the present invention to one embodiment of an "electric motor".

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A hybrid vehicle traveling with fuel and electric power as energy sources, comprising:
    a charging device configured to be capable of charging a power storage device from a power supply external to the vehicle, said power storage device storing said electric power;
    a calculation unit for calculating a first physical quantity involved in consuming first electric power supplied from outside the vehicle by said charging device and a second physical quantity involved in consuming said fuel; and
    a notification unit for notifying a user of information based on said first and second physical quantities calculated by said calculation unit, wherein
    said calculation unit divides an amount of electric power that said power storage device stores therein into a first electric power storage and a second electric power storage for management,
    said first electric power storage is attributed to electric power supplied from said power supply, and includes regenerated electric power recovered when the vehicle travels on the electric power supplied from said power supply,
    said second electric power storage is attributed to electric power generated from said fuel, and includes regenerated electric power recovered when the vehicle travels on the electric power generated from said fuel; and
    said second physical quantity is calculated based on the second electric power storage.

2. The hybrid vehicle according to claim 1, wherein:
    said power storage device stores second electric power of electrical energy converted from energy attributed to the fuel; and
    said calculation unit calculates said second physical quantity using said second electric power.

3. The hybrid vehicle according to claim 1, wherein:
    said first physical quantity is a value having a correlation with a ratio of an amount of electric power supplied from said power supply and a distance traveled on said amount of electric power; and
    said second physical quantity is a value having a correlation with a ratio of an amount of said fuel and a distance traveled on said amount of said fuel.

4. The hybrid vehicle according to claim 1, wherein:
    the information based on said first and second physical quantities is a value having a correlation with a ratio of a sum of a physical quantity corresponding to an amount of electric power supplied from said power supply and a physical quantity corresponding to an amount of said fuel and a sum of a distance traveled on said amount of electric power and a distance traveled on said fuel.

5. The hybrid vehicle according to claim 1, wherein:
    said first physical quantity is a first distance traveled indicating a distance traveled per unit amount of electric power supplied from said power supply; and
    said second physical quantity is a second distance traveled indicating a distance traveled per unit amount of said fuel.

6. The hybrid vehicle according to claim 5, further comprising:
an internal combustion engine supplied with said fuel;
an electric motor supplied with said electric power for causing the vehicle to travel; and
a traveling mode control unit for controlling switching between traveling modes including a first mode causing the vehicle to travel with said internal combustion engine stopped and a second mode including a mode causing the vehicle to travel with said internal combustion engine operated, wherein
said calculation unit in said first mode calculates said first distance traveled and in said second mode calculates said second distance traveled.

7. The hybrid vehicle according to claim 6, wherein said calculation unit calculates said first distance traveled, such that regenerated electric power recovered in said first mode by said electric motor is assumed as electric power supplied from said power supply, recovered, and said calculation unit calculates said second distance traveled, such that regenerated electric power recovered in said second mode is assumed as an amount of fuel equivalent to said regenerated electric power converted in terms of fuel, recovered.

8. The hybrid vehicle according to claim 1, wherein:
said first physical quantity is a first cost indicating a cost, per unit distance traveled, of electric power supplied from said power supply; and
said second physical quantity is a second cost indicating a cost of said fuel per unit distance traveled.

9. The hybrid vehicle according to claim 8, further comprising:
an internal combustion engine supplied with said fuel;
an electric motor supplied with said electric power for causing the vehicle to travel; and
a traveling mode control unit for controlling switching between traveling modes including a first mode causing the vehicle to travel with said internal combustion engine stopped and a second mode including a mode causing the vehicle to travel with said internal combustion engine operated, wherein
said calculation unit in said first mode calculates said first cost and in said second mode calculates said second cost.

10. The hybrid vehicle according to claim 9, wherein said calculation unit calculates said first cost such that regenerated electric power recovered in said first mode by said electric motor is assumed as electric power supplied from said power supply, recovered, and said calculation unit calculates said second cost such that regenerated electric power recovered in said second mode is assumed as an amount of fuel equivalent to said regenerated electric power converted in terms of fuel, recovered.

11. The hybrid vehicle according to claim 8, wherein said notification unit further notifies the user of a sum of said first and second costs.

12. The hybrid vehicle according to claim 1, wherein:
said first physical quantity is a value having a correlation with an amount of carbon dioxide emitted corresponding to electric power supplied from said power supply; and
said second physical quantity is a value having a correlation with an amount of carbon dioxide emitted corresponding to said fuel consumed.

13. The hybrid vehicle according to claim 1, wherein:
said first physical quantity is a first amount of carbon dioxide emitted indicating an amount of carbon dioxide emitted, per unit distance traveled, attributed to electric power supplied from said power supply; and
said second physical quantity is a second amount of carbon dioxide emitted indicating an amount of carbon dioxide emitted per unit distance traveled on said fuel.

14. The hybrid vehicle according to claim 13, further comprising:
an internal combustion engine supplied with said fuel;
an electric motor supplied with said electric power for causing the vehicle to travel; and
a traveling mode control unit for controlling switching between traveling modes including a first mode causing the vehicle to travel with said internal combustion engine stopped and a second mode including a mode causing the vehicle to travel with said internal combustion engine operated, wherein
said calculation unit in said first mode calculates said first amount of carbon dioxide emitted and in said second mode calculates said second amount of carbon dioxide emitted.

15. The hybrid vehicle according to claim 14, wherein said calculation unit calculates said first amount of carbon dioxide emitted, such that regenerated electric power recovered in said first mode by said electric motor is assumed as electric power supplied from said power supply, recovered, and said calculation unit calculates said second amount of carbon dioxide emitted, such that regenerated electric power recovered in said second mode is assumed as an amount of fuel equivalent to said regenerated electric power converted in terms of fuel, recovered.

16. The hybrid vehicle according to claim 13, wherein said notification unit further notifies the user of a sum of said first and second amounts of carbon dioxide emitted.

17. A method of notification for a hybrid vehicle traveling with fuel and electric power as energy sources, said hybrid vehicle including a charging device configured to be capable of charging a power storage device from a power supply external to said vehicle, said power storage device storing said electric power, the method comprising the steps of:
calculating, with a calculation unit, a first physical quantity involved in consuming first electric power supplied from outside the vehicle by said charging device;
calculating, with the calculation unit, a second physical quantity involved in consuming said fuel;
dividing, with the calculation unit, an amount of electric power that said power storage device stores therein into a first electric power storage and a second electric power storage for management, and
notifying a user, with a notification unit, of information based on said first and second physical quantities calculated, wherein
said first electric power storage is attributed to electric power supplied from said power supply, and includes regenerated electric power recovered when the vehicle travels on the electric power supplied from said power supply,
said second electric power storage is attributed to electric power generated from said fuel, and includes regenerated electric power recovered when the vehicle travels on the electric power generated from said fuel; and
said second physical quantity is calculated based on the second electric power storage.

18. The method of notification for a hybrid vehicle according to claim 17, wherein:
said power storage device stores second electric power of electrical energy converted from energy attributed to the fuel; and said second physical quantity is calculated using said second electric power.

19. The method of notification for a hybrid vehicle according to claim 17, wherein:
said first physical quantity is a value having a correlation with a ratio of an amount of electric power supplied from said power supply and a distance traveled on said amount of electric power; and
said second physical quantity is a value having a correlation with a ratio of an amount of said fuel and a distance traveled on said amount of said fuel.

20. The method of notification for a hybrid vehicle according to claim 17, wherein:
the information based on said first and second physical quantities is a value having a correlation with a ratio of a sum of a physical quantity corresponding to an amount of electric power supplied from said power supply and a physical quantity corresponding to an amount of said fuel and a sum of a distance traveled on said amount of electric power and a distance traveled on said fuel.

21. The method of notification for a hybrid vehicle according to claim 17, wherein:
said first physical quantity is a first distance traveled indicating a distance traveled per unit amount of electric power supplied from said power supply; and
said second physical quantity is a second distance traveled indicating a distance traveled per unit amount of said fuel.

22. The method of notification for a hybrid vehicle according to claim 21, wherein:
said hybrid vehicle has mounted therein an internal combustion engine supplied with said fuel and an electric motor supplied with said electric power for causing the vehicle to travel and is capable of traveling in one of a first mode causing the vehicle to travel with said internal combustion engine stopped and a second mode including a mode causing the vehicle to travel with said internal combustion engine operated; and
in said first mode, said first distance traveled is calculated in the step of calculating said first distance traveled;
in said second mode, said second distance traveled is calculated in the step of calculating said second distance traveled.

23. The method of notification for a hybrid vehicle according to claim 22, wherein:
the step of calculating said first distance traveled includes calculating said first distance traveled, such that regenerated electric power recovered in said first mode by said electric motor is assumed as electric power supplied from said power supply, recovered; and
the step of calculating said second distance traveled includes calculating said second distance traveled, such that regenerated electric power recovered in said second mode is assumed as an amount of fuel equivalent to said regenerated electric power converted in terms of fuel, recovered.

24. The method of notification for a hybrid vehicle according to claim 17, wherein:
said first physical quantity is a first cost indicating a cost, per unit distance traveled, of electric power supplied from said power supply; and
said second physical quantity is a second cost indicating a cost of said fuel per unit distance traveled.

25. The method of notification for a hybrid vehicle according to claim 24, wherein:
said hybrid vehicle has mounted therein an internal combustion engine supplied with said fuel and an electric motor supplied with said electric power for causing the vehicle to travel and is capable of traveling in one of a first mode causing the vehicle to travel with said internal combustion engine stopped and a second mode including a mode causing the vehicle to travel with said internal combustion engine operated; and
in said first mode, said first cost is calculated in the step of calculating said first cost;
in said second mode, said second cost is calculated in the step of calculating said second cost.

26. The method of notification for a hybrid vehicle according to claim 25, wherein:
the step of calculating said first cost includes calculating said first cost such that regenerated electric power recovered in said first mode by said electric motor is assumed as electric power supplied from said power supply, recovered; and
the step of calculating said second cost includes calculating said second cost such that regenerated electric power recovered in said second mode is assumed as an amount of fuel equivalent to said regenerated electric power converted in terms of fuel, recovered.

27. The method of notification for a hybrid vehicle according to claim 24, further comprising the step of notifying the user of a sum of said first and second costs.

28. The method of notification for a hybrid vehicle according to claim 17, wherein:
said first physical quantity is a value having a correlation with an amount of carbon dioxide emitted corresponding to electric power supplied from said power supply; and
said second physical quantity is a value having a correlation with an amount of carbon dioxide emitted corresponding to said fuel consumed.

29. The method of notification for a hybrid vehicle according to claim 17, wherein:
said first physical quantity is a first amount of carbon dioxide emitted indicating an amount of carbon dioxide emitted, per unit distance traveled, attributed to electric power supplied from said power supply; and
said second physical quantity is a second amount of carbon dioxide emitted indicating an amount of carbon dioxide emitted per unit distance traveled on said fuel.

30. The method of notification for a hybrid vehicle according to claim 29, wherein:
said hybrid vehicle has mounted therein an internal combustion engine supplied with said fuel and an electric motor supplied with said electric power for causing the vehicle to travel and is capable of traveling in one of a first mode causing the vehicle to travel with said internal combustion engine stopped and a second mode including a mode causing the vehicle to travel with said internal combustion engine operated; and
in said first mode, said first amount of carbon dioxide emitted is calculated in the step of calculating said first amount of carbon dioxide emitted;
in said second mode, said second amount of carbon dioxide emitted is calculated in the step of calculating said second amount of carbon dioxide emitted.

31. The method of notification for a hybrid vehicle according to claim 30, wherein:
the step of calculating said first amount of carbon dioxide emitted includes calculating said first amount of carbon dioxide emitted, such that regenerated electric power recovered in said first mode by said electric motor is assumed as electric power supplied from said power supply, recovered; and the step of calculating said second amount of carbon dioxide emitted includes calculating said second amount of carbon dioxide emitted, such that regenerated electric power recovered in said second mode is assumed as an amount of fuel equivalent to said regenerated electric power converted in terms of fuel, recovered.

32. The method of notification for a hybrid vehicle according to claim 29, further comprising the step of notifying the user of a sum of said first and second amounts of carbon dioxide emitted.

33. The hybrid vehicle according to claim 1, wherein:
said power storage device is configured to be capable of storing said first electric power supplied from outside the vehicle and second electric power of electrical energy converted from energy attributed to the fuel; and
said calculation unit manages an amount of said second electric power stored in said power storage device separately from an amount of said first electric power stored in said power storage device and calculates said second physical quantity based on the amount of said second electric power stored in said power storage device.

34. The method of notification for a hybrid vehicle according to claim 17, said power storage device being configured to be capable of storing said first electric power supplied from outside the vehicle and second electric power of electrical energy converted from energy attributed to the fuel, the method further comprising the steps of:
calculating an amount of said first electric power stored in said power storage device; and
calculating an amount of said second electric power stored in said power storage device, wherein
the step of calculating said second physical quantity includes the step of calculating said second physical quantity based on the amount of said second electric power stored in said power storage device.

* * * * *